United States Patent [19]

Tsuboi

[11] 4,375,195
[45] Mar. 1, 1983

[54] CARRYING DEVICE WITH SLIDERS AND RAIL

[76] Inventor: Nobuyuki Tsuboi, 2-1, Okayama 5-Chome, Shijonawate, Osaka 575, Japan

[21] Appl. No.: 241,815

[22] Filed: Mar. 9, 1981

[51] Int. Cl.³ .............................................. B61F 9/002
[52] U.S. Cl. ....................................... 104/246; 191/49; 191/59.1; 308/6 B
[58] Field of Search ............... 104/242, 245, 246, 247; 191/49, 59, 59.1, 63, 63.1–63.5, 57, 29, 29 DM; 308/3 R, 3 A, 3 B, 3 C, 3 CH, 3.5, 3.8, 6 B

[56] References Cited

U.S. PATENT DOCUMENTS

| | | | |
|---|---|---|---|
| 2,136,766 | 11/1938 | Tegge | 191/29 |
| 3,575,454 | 4/1971 | Meeker | 104/246 X |
| 3,672,308 | 6/1972 | Segar | 104/246 |
| 3,790,725 | 2/1974 | Charamel et al. | 191/29 R |

FOREIGN PATENT DOCUMENTS 4948  4/1920  Netherlands ........................ 191/49

OTHER PUBLICATIONS

IKO Catalog vol. 33, Nippon Thompson Co., Ltd., pp. 258, 261 and their English translation.

Primary Examiner—Joseph F. Peters, Jr.
Assistant Examiner—M. J. Hill
Attorney, Agent, or Firm—Sandler & Greenblum

[57] ABSTRACT

A plurality of sliders and a guide rail along which the sliders run to carry a load, each slider having thin U-letter shape members so layered in the longitudinal direction of guide rail as to form a channel shape casing with a hexagonal central aperture in which rollers are included to run along a hexagonal head of the guide rail in an engaging relation.

12 Claims, 12 Drawing Figures

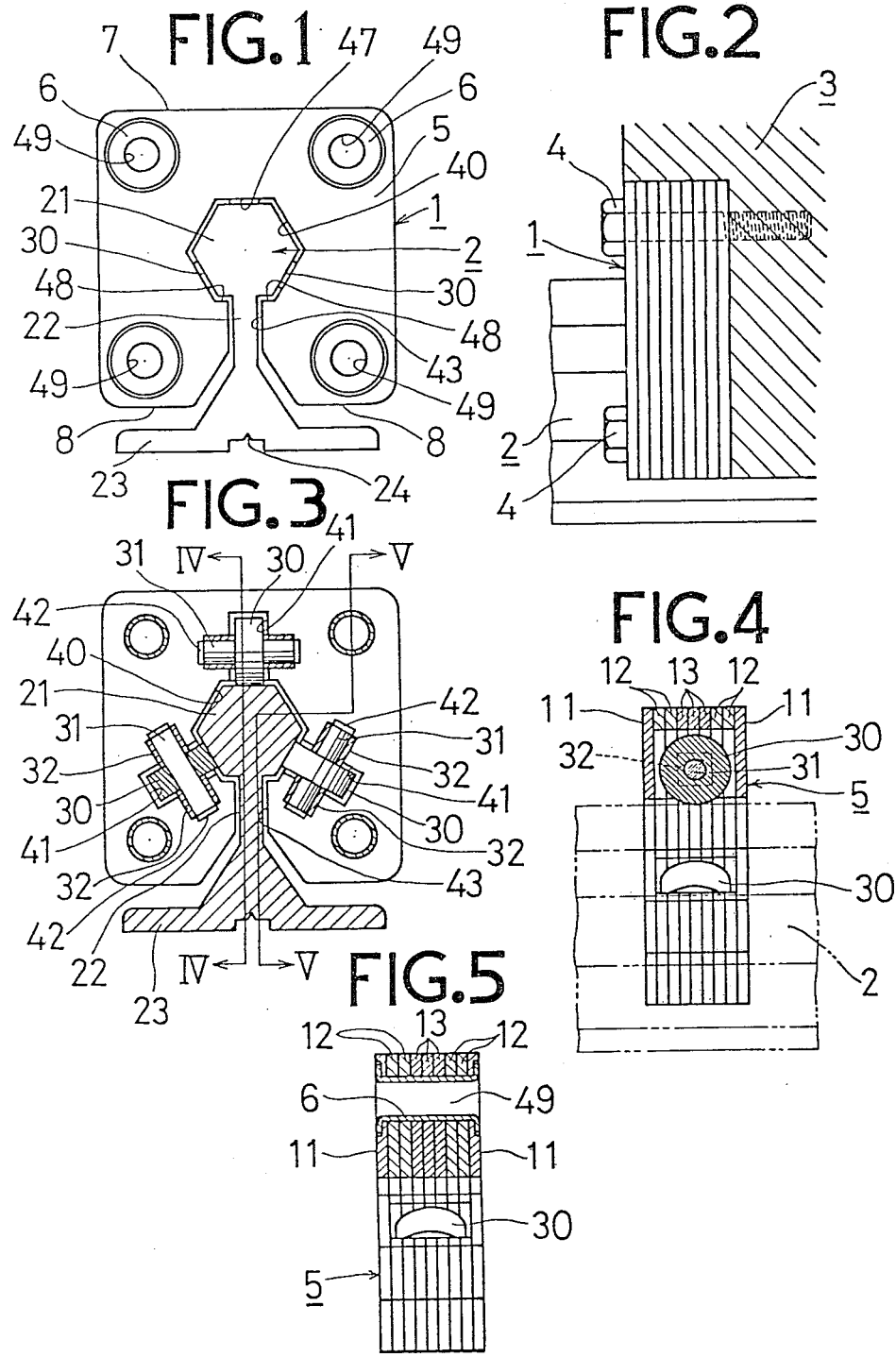

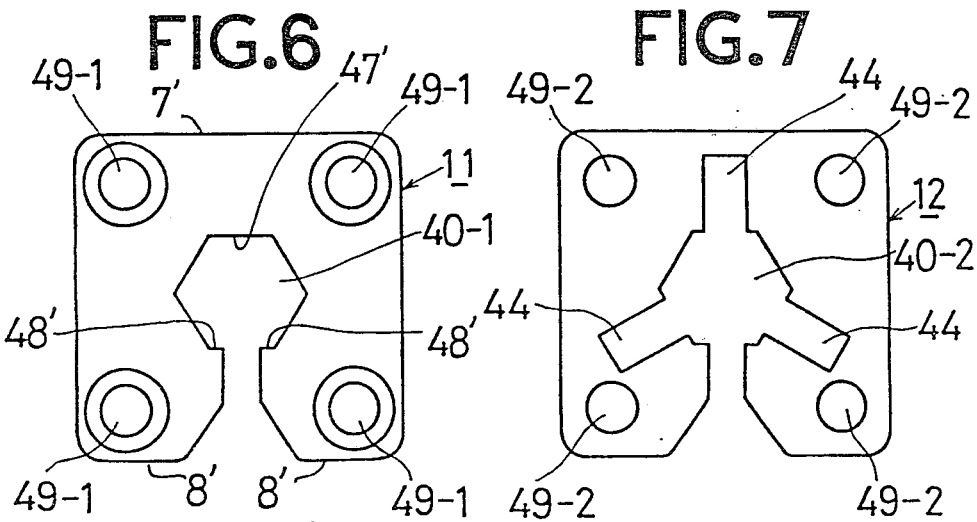
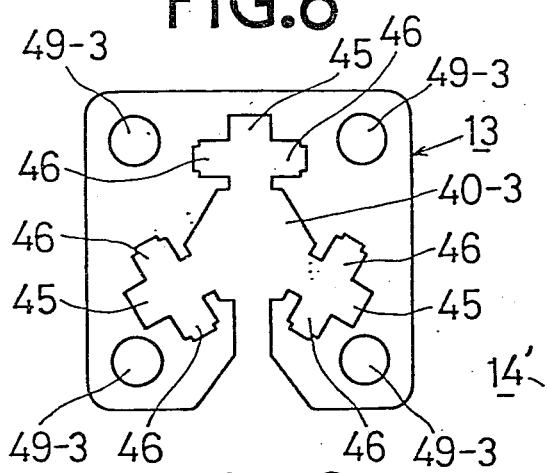
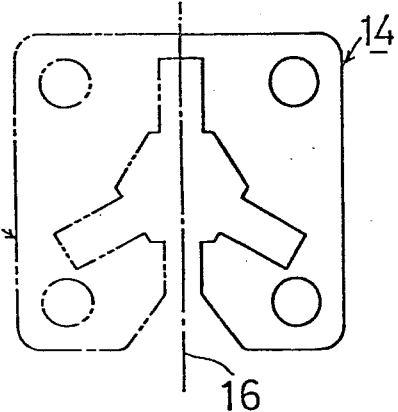
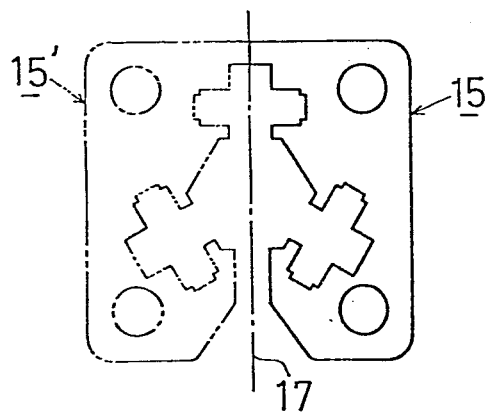

CARRYING DEVICE WITH SLIDERS AND RAIL

FIELD OF THE INVENTION

The present invention relates to a carrying device, and more particularly to a slider-and-rail type carrying device in which usually a plurality of sliders run along a guide rail to carry a load.

BACKGROUND OF THE INVENTION

Conventionally there are various carrying devices of such kind for various purposes. However it has hitherto been desired to provide novel carrying devices to meet a greatly increasing variety of need.

SUMMARY OF THE INVENTION

A main object of the invention is to provide a slider-and-rail type carrying device suitable for quantity production and workable with high efficiency.

A more specific object of the invention is to provide a carrying device in which a plurality of sliders run along a guide rail in a hexagonally engaging relation to it to carry a load.

A still more specific object of the invention is to provide a slider-and-rail type carrying device in which each slider has a plurality of substantially U-letter shape thin members so layered in the longitudinal direction of a guide rail as to form a substantially channel shape casing with a substantially hexagonal inner periphery, and also has a plurality of rollers so arranged in the hexagonal inner periphery of casing as to rotate freely in the above-mentioned longitudinal direction, the guide rail having a substantially hexagonal head.

Another object of the invention is to provide a carrying device with sliders and a guide rail which can be manufactured, assembled, and set easily with high accuracy.

A further object of the invention is to provide a carrying device in which sliders can run along a guide rail assuredly in any case where the guide rail is set on a horizontal, vertical or sloping structure, and even when the guide rail is set in a suspending relation to a ceiling.

A further object of the invention is to provide a carrying device in which sliders can run along a guide rail in a light and noiseless manner with negligible maintenance.

BRIEF DESCRIPTION OF THE DRAWINGS

Other objects and advantages of the invention will be readily appreciated as they become better understood hereinafter when considered in connection with the accompanying drawings in which:

FIG. 1 is a front elevation of a carrying device embodying the invention;

FIG. 2 is a side view of the embodiment in FIG. 1, when it carries a load;

FIG. 3 is a front view in vertical section of the embodiment in FIG. 1;

FIG. 4 is a transverse section taken approximately on the line IV—IV in FIG. 3, the guide rail being shown in dotted line;

FIG. 5 is a transverse section taken approximately on the line V—V in FIG. 3, the guide rail being excluded;

FIG. 6 is a front view of an end member of the casing in FIG. 4;

FIG. 7 is a front view of an intermediate member of the casing in FIG. 4;

FIG. 8 is a front view of a middle member of the casing in FIG. 4;

FIG. 9 shows a modification of the intermediate member in FIG. 7;

FIG. 10 shows a modification of the middle member in FIG. 8;

DESCRIPTION OF THE INVENTION

Figure 11:
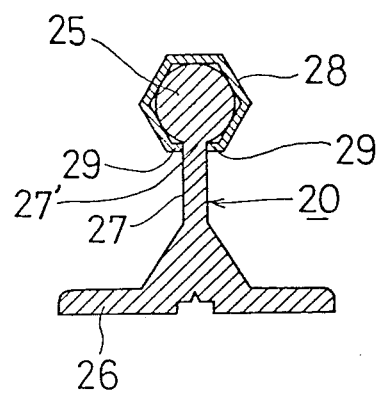
FIG. 11 shows a modification of the guide rail in FIG. 3.

Referring to FIGS. 1 to 8, the carrying device embodying the invention primarily comprises a guide rail 2 and a slider 1 to run along the guide rail 2 to carry a load 3.

The guide rail 2 is set on a stationary supporting structure (not shown) in a fixed relation to it. The slider 1 is fixed to the load 3 with bolts 4 when it carries the load 3, as shown in FIG. 2.

The guide rail 2 comprises a head 21, a base plate 23 and a web 22 intermediate 21 and 23. The head 21 has a regular hexagonal cross section. The base plate 23 is provided with a center mark 24.

Each slider 1 has a plurality of substantially U-letter shape thin members 11, 12 & 13 layered in the longitudinal direction of guide rail 2. They are united together with hollow rivets 6, and thus form a substantially channel shape casing 5 of each slider 1.

The slider casing 5 has a substantially square outer periphery, a regular hexagonal inner periphery which defines a regular hexagonal central aperture 40, and a slit 43 through which both peripheries communicate with each other.

The square of casing outer periphery has a top side 7 and a bottom side 8 oppositely. As best shown in FIG. 1, one of the hexagonal sides of casing inner periphery, designated as 47, is placed nearest to the square top side 7 of casing outer periphery among all the hexagonal sides of casing inner periphery, and parallel to the same top side 7; accordingly, the hexagonal side 48 opposite to 47 is placed nearest to the square bottom side 8 among all the hexagonal sides, and parallel to the same bottom side 8. The slit 43 is intermediate the hexagonal side 48 and the square bottom side 8.

Each slider 1 also has three rollers 30 provided in recesses 41 which extend radiately from every other side of the hexagonal inner periphery of casing 5, one of the recesses 41 extending from the hexagonal side 47 in an opposite relation to the slit 43.

As best shown in FIG. 3, each roller 30 is supported with a pin 31 in a freely rotatable relation to it, and each pin 31 is supported with a pair of journal bearings 32 in a freely rotatable relation to them. The pins 31 and journal bearings 32 are provided in recesses 42 which traverse the radiate recesses 41 at right angles with them respectively. Each journal bearing 32 is in a stationarily supported relation to the corresponding traversal recess 42. Thus the rollers 30 are freely rotatable in the longitudinal direction of guide rail 2 in relation to the casing 5.

The hexagonal head 21 and web 22 of guide rail 2 are loosely inserted into the hexagonal central aperture 40 and slit 43 of slider casing 5 respectively, the hexagonal head 21 being in an engaging relation to the hexagonal central aperture 40. And the rollers 30 are in a freely rollable relation to the hexagonal head 21 of guide rail 2, the three rollers 30 treading every other side of the regular hexagonal head 21. Thus each slider 1 can run along the guide rail 2 in a hexagonally engaging relation to it.

Each U-letter shape member 11 has the configuration best shown in FIG. 6. It has a substantially square outer periphery, a regular hexagonal inner periphery which defines a regular hexagonal central aperture 40-1, and a slit 43-1 through which both peripheries communicate with each other. The regular hexagonal central aperture 40-1 is slightly larger than the regular hexagonal cross section of guide rail head 21.

The square outer periphery of U-letter shape member 11 has a top side 7' and a bottom side 8' oppositely. One of the hexagonal sides of inner periphery thereof, designated as 47', is placed nearest to the square top side 7' of outer periphery thereof among all the hexagonal sides of inner periphery thereof, and parallel to the same top side 7'; accordingly, the hexagonal side 48' opposite to 47' is placed nearest to the square bottom side 8' among all the hexagonal sides, and parallel to the same bottom side 8'. The slit 43-1 is intermediate the hexagonal side 48' and the square bottom side 8'.

The U-letter shape member 11 is provided with four rivet holes 49-1 at the four corners of square outer periphery.

Each U-letter shape member 12 has the configuration best shown in FIG. 7. It has a substantially square outer periphery, a regular hexagonal inner periphery which defines a regular hexagonal central aperture 40-2, and a slit 43-2 through which both peripheries communicate with each other.

The square outer periphery of U-letter shape member 12 has the same size as that of 11. The regular hexagonal central aperture 40-2 has the same size and position as 40-1. The slit 43-2 has the same shape, size and position as 43-1.

The U-letter shape member 12 is provided with three rectangular slots 44 which extend radiately from every other side of the hexagonal inner periphery thereof, one of the slots 44 extending from that side of hexagonal inner periphery which is opposite to the slit 43-2.

The U-letter shape member 12 is provided with four rivet holes 49-2 at the four corners of square outer periphery. The rivet holes 49-2 have the same shape, size and position as 49-1.

Each U-letter shape member 13 has the configuration best shown in FIG. 8. It has a substantially square outer periphery, a regular hexagonal inner periphery which defines a regular hexagonal central aperture 40-3, and a slit 43-3 through which both peripheries communicate with each other.

The square outer periphery of U-letter shape member 13 has the same size as that of 12. The regular hexagonal central aperture 40-3 has the same size and position as 40-2. The slit 43-3 has the same shape, size and position as 43-2.

The U-letter shape member 13 is provided with three rectangular slots 45 which extend radiately from every other side of the hexagonal inner periphery thereof. The radiate slots 45 have the same shape, size and position as 44. The U-letter shape member 13 is also provided with three rectangular slots 46 which traverse the radiate slots 45 at right angles with them respectively.

In addition, the U-letter shape member 13 is provided with four rivet holes 49-3 at the four corners of square outer periphery. The rivet holes 49-3 have the same shape, size and position as 49-2.

The casing 5 of each slider 1 is composed with a pair of the U-letter shape members 11 at both ends, a plurality of the U-letter shape members 13 in the middle portion and a plurality of the U-letter shape members 12 intermediate 11 & 13, as best shown in FIGS. 4 & 5. All the U-letter shape members 11, 12 & 13 have a given thickness.

The central apertures 40-1, 40-2 & 40-3 of U-letter shape members 11, 12 & 13 are layered together to be the central aperture 40 of slider casing 5. The slits 43-1, 43-2 & 43-3 of U-letter shape members 11, 12 & 13 are layered together to be the slit 43 of slider casing 5. The rivet holes 49-1, 49-2 & 49-3 of U-letter shape members 11, 12 & 13 are layered together to be the rivet holes 49 of slider casing 5 respectively. The radiate slots 44 & 45 of U-letter shape members 12 & 13 are layered together to be the radiate recesses 41 of slider casing 5 respectively. The transverse slots 46 of U-letter shape members 13 are layered together to be the traversal recesses 42 of slider casing 5 respectively.

Each journal bearing 32 has an outer periphery of square cross section, each side of the square cross section being equal to the width of traversal slot 46. Accordingly, the total thickness of U-letter shape members 13 employed is equal to the width of one traversal slot 46.

The U-letter shape members 11, 12 & 13 are usually made by punching a rigid thin plate material, such as metal and synthetic resin, of a given thickness. Therefore a large number of such U-letter shape thin members can be easily manufactured with which accuracy in shape and size at substantially low cost.

The guide rail 2 is usually made by injecting a metallic material with substantial plasticity and durability, such as aluminium. Therefore a large quantity of such guide rails can be easily manufactured with considerable accuracy in shape and size at substantially low cost.

The slider 1 can be assembled with ease merely by layering the U-letter shape members 11, 12 & 13 one after another, providing the rivets 6 through the holes 49, and putting the rollers 30 together with the pins 31 and journal bearings 32 into the recesses 41 & 42 during the layering of U-letter shape members 12 & 13. It will facilitate putting the journal bearings 32 into the recesses 42 firmly that the outer periphery of each journal bearing 32 has a square cross section.

Since the U-letter shape members 11, 12 & 13 are shaped and sized with high accuracy, they can be united together into the slider casing 5 with excellent alignment and integrality merely by providing the rivets 6 through the holes 49. Thus the slider casing 5 can be assembled easily with high accuracy.

A desired number of sliders 1 can be put into the hexagonally engaging relation to the guide rail 2 without any difficulty merely by inserting the hexagonal head 21 and web 22 of guide rail 2 through the hexagonal central apertures 40 and slits 43 of slider 1 one after another in the longitudinal direction of guide rail 2; the three rollers 30 of each slider 1 tread every other side of the regular hexagonal head 21 of guide rail 2.

Since each slider 1 is in the hexagonally engaging relation to the guide rail 2 with the three rollers 30 treading every other side of the regular hexagonal head 21, there is no possibility that the slider 1 runs off the guide rail 2, and thus each slider can run along the guide rail 2 quite assuredly. Moreover, the slider 1 can run along the guide rail 2 in a well balanced state without swinging to either side.

The high accuracy in shape, size and assembling of slider 1 makes it possible to put each slider 1 in an accurate working relation to the guide rail 2. Because of these two features and the above-mentioned feature of well balanced running, each slider 1 can run along the guide rail 2 in quite a light and noiseless manner, even when the rail surface is not finished accurately.

The rollers 30 are usually made of synthetic resin or oil-less metal. These materials require no lubrication and therefore there is usually no need of maintenance during the service of rollers 30.

The guide rail 2 can be set easily and firmly on the supporting structure (not shown) in a fixed relation to it with suitable means (not shown). The central mark 24 of base plate 23 will facilitate accurate setting of the guide rail 2.

The guide rail 2 can be set on not only horizontal but also vertical and sloping structures; it can be set even in a suspending relation to a ceiling. And in any case, each slider 1 can run along the guide rail 2 assuredly because of the above-described hexagonally engaging relation.

The sliders 1 can be fixed easily and firmly to a load 3 merely by providing bolts 4 through the hollows of rivets 6.

It may be good that some of the U-letter shape members 11, 12 & 13 are made of a material different from the others for a special purpose. For instance, some of the U-letter shape members may be made of a magnetic material so that the sliders 1 may cooperate with some electromagnetic means (not shown) if provided along the guide rail 2.

It may be good to substitute each of the U-letter shape thin members 12 in FIG. 7 by a pair of thin members 14 & 14' made symmetrical in relation to an imaginary center line 16 in FIG. 9. Each pair of 14 & 14', when combined symmetrically, has the same size and shape as 12. Likewise each of the U-letter shape thin members 13 in FIG. 8 may be substituted by a pair of thin members 15 & 15' made symmetrical in relation to an imaginary center line 17 in FIG. 10. Such substitution will increase the ease, and decrease the cost, of manufacturing the thin members of slider casing 5 in quantity.

It may be good that at least one of the rollers 30 is made of a material different from the others. And it is possible to employ minature roller bearings as the rollers 30.

It may be good to substitute the guide rail 2 in FIG. 3 by another guide rail 20 in FIG. 11. The guide rail 20 has a head comprising a core 25 and a shell 28 covered over the core 25. The head core 25 has a round cross section, and is made integral with a web 27 and a base plate 26 by injecting a material with relatively high plasticity and low cost, such as aluminium, copper alloy and synthetic resin. The head shell 28 has a regular hexagonal cross section, and is made separately from the round head core 25, web 27 and base plate 26 by forming a thin plate material with relatively high durability and elasticity, such as stainless steel.

In assembling, the round head core 25 and a neck 27' of the web 27 immediately below the core 25 are closely inserted into the hexagonal head shell 28 in the longitudinal direction of guide rail 20.

The hexagonal shell 28 has a pair of jaws 29 provided by removing one side of the hexagon partially. The jaws 29 can be opened wider against its own elasticity when the core 25 and neck 27' are inserted into the shell 28, and tend to be closed by its own elasticity after the insertion so as to keep the shell 28 tightly over the core 25.

The above-mentioned material of head core 25, web 27 and base plate 26 will increase the ease, and decrease the cost, of manufacturing them integrally by injection.

The above-mentioned material of head shell 28 will increase the overall durability of rail head especially against abrasion in relation to the rollers 30. And it is possible to make the shell 28 with high accuracy in size, even in a substantially long size, because it is made by forming a thin plate material.

If it is made in a substantially long size, the head shell 28 can cover a plurality of head cores 25 in series in the longitudinal direction thereof, and thus provide a substantially long jointless guide rail in total.

Figure 12:
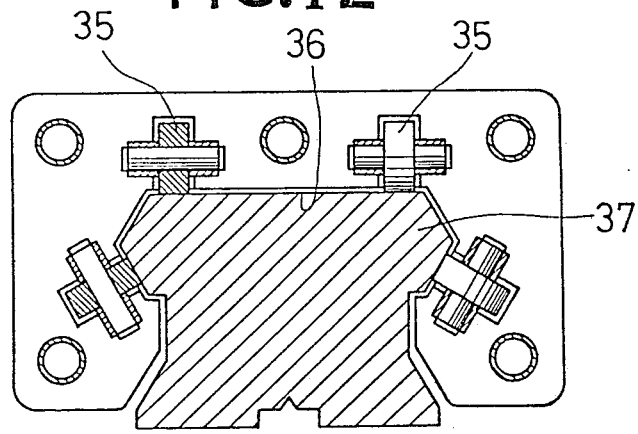
FIG. 12 shows a modification of the embodiment in FIG. 3.

It may be good to employ an elongated configuration as shown in FIG. 12 instead of the regular configuration shown in FIG. 3. In FIG. 12 a plurality of rollers 35 are provided in an elongated hexagonal side 36 of a slider casing inner periphery which is in an engaging relation to an elongated hexagonal rail head 37.

Various other irregular hexagonal configurations may be employable.

All the above-given embodiments will be suitable for quantity production and workable with high efficiency because of all the above-described features and advantages.

It will be understood that further modifications may be made in the constructions of the above-given embodiments, and that the invention is in no way limited thereto.

What I claim is:

1. A carrying device comprising:
   (a) a guide rail comprising a head, a base and a web disposed intermediate to said head and said base; and
   (b) at least one slider to run along said rail to carry a load in a longitudinal direction of said rail, said at least one slider having a plurality of substantially U-shaped thin members layered in said longitudinal direction of said rail to form a substantially channel-shaped casing with an outer periphery, an inner periphery and a slit through which said inner periphery and said outer periphery communicate with each other, said inner periphery of said casing defining a central aperture in said casing, said inner periphery having a plurality of radiately extending recesses extending radiately from said inner periphery, said at least one slider having a plurality of rollers, each roller being disposed in a respective one of said radiately extending recesses and being adapted to rotate freely in said longitudinal direction of said rail in relation to said casing, said head and web of said rail being loosely inserted through said central aperture and slit of said casing respectively, said rail head being in an engaging relation to said casing central aperture, said rollers being adapted to make freely rolling contact with said rail head.

2. A carrying device in accordance with claim 1 wherein said rollers are provided with support means to support them in a freely rotatable relation with respect to said support means, said support means being disposed in recesses which traverse said radiately extending recesses at right angles.

3. A carrying device in accordance with claim 2 wherein said head of said guide rail is made integral with said web and base.

4. A carrying device in accordance with claim 2 wherein said head of said guide rail comprises a core member and a shell member covered over said core member, said core member being made integral with said web and base by injecting a material with relatively high plasticity, said shell member being made separately from said web and base by forming an elastic material, said core member being tightly inserted into said shell member against the elasticity of said shell member.

5. A carrying device for running along a guide rail to carry a load in the longitudinal direction of said guide rail comprising a slider having a plurality of flat members layered in the longitudinal direction of the rail to form a substantially channel-shaped casing.

6. A carrying device in accordance with claim 5 wherein said flat members include aligned holes for receiving a rivet which holds said flat members together in a layer to form said casing.

7. A carrying device in accordance with claim 5 wherein said casing has a plurality of radiately extending recesses extending radiately from said casing and said slider has a plurality of rollers, each roller being disposed in a respective one of said radiately extending recesses and being adapted to rotate freely in the longitudinal direction of the rail in relation to the casing.

8. A carrying device in accordance with claim 7 wherein each roller has support means which support said each roller in a freely rotatable relation with respect to said support means, said support means being disposed in recesses which traverse said radiately extending recesses at right angles.

9. A carrying device in accordance with claim 8 wherein each of said recesses which traverse said radiately extending recesses at right angles has a square cross-section and wherein a journal bearing of square cross-section is disposed in each of said recesses which traverse said radiately extending recesses at right angles.

10. A carrying device in accordance with claim 5 wherein said guide rail comprises a core member and a shell member covered over said core member wherein said shell member is formed of an elastic material such that it locks onto said core member of said guide rail.

11. A carrying device in accordance with claim 10 wherein said shell member forms a pair of jaws for locking said shell member onto said head of said guide rail.

12. A carrying device in accordance with claim 5 further including an elongated shell member adapted to cover a plurality of guide rails arranged in series.

* * * * *